United States Patent [19]

Itabashi et al.

[11] Patent Number: 4,923,844

[45] Date of Patent: May 8, 1990

[54] HEAT-SENSITIVE RECORDING MATERIAL

[75] Inventors: Yuichi Itabashi; Takayuki Hayashi; Akira Igarashi, all of Shizuoka, Japan

[73] Assignee: Fuji Photo Film Co., Ltd., Kanagawa, Japan

[21] Appl. No.: 327,840

[22] Filed: Mar. 23, 1989

[30] Foreign Application Priority Data

Mar. 23, 1988 [JP] Japan ............................... 62-069053
Jun. 20, 1988 [JP] Japan ..................................... 151800

[51] Int. Cl.[5] ............................................... G01M 5/18

[52] U.S. Cl. .................................... 503/207; 427/152; 428/304.4; 428/315.5; 428/315.9; 428/317.9; 428/403; 428/407; 428/913; 428/914; 503/226

[58] Field of Search ................................ 427/150-152; 503/200, 226, 207; 428/304.4, 315.5, 315.9, 317.9, 318.4, 403, 407, 913, 914

[56] References Cited

FOREIGN PATENT DOCUMENTS 225987 12/1984 Japan .................................. 428/195

*Primary Examiner*—Pamela R. Schwartz
*Attorney, Agent, or Firm*—Sughrue, Mion, Zinn, Macpeak & Seas

[57] ABSTRACT

A heat-sensitive recording material comprising a support having provided thereon a heat-sensitive recording layer, wherein (a) a microporous layer comprising at least one of a synthetic resin and a cellulose compound or (b) a layer comprising porous grains comprising secondary particles bound to the surface of primary particle as core is provided between the heat-sensitive recording layer and the support of the recording material.

10 Claims, No Drawings

HEAT-SENSITIVE RECORDING MATERIAL

FIELD OF THE INVENTION

The present invention relates to a heat-sensitive recording material. More particularly, the present invention relates to a heat-sensitive recording material which can provide a high density recorded image at a minute amount of energy.

BACKGROUND OF THE INVENTION

Recording materials comprising electron-donating dye precursors and electron-accepting compounds are well known as pressure-sensitive recording paper, heat-sensitive recording paper, light-sensitive pressure-sensitive recording paper, electric heat-sensitive recording paper, etc.

Details of such recording materials are described in British Patent No. 2,140,449, U.S. Pat. Nos. 4,480,052 and 4,436,920, JP-B-60-23922 (the term "JP-B" as used herein means an "examined Japanese patent publication"), and JP-A-57-179836, JP-A-60-123556, and JP-A-60-123557 (the term "JP-A" as used herein means an "unexamined published Japanese patent application").

In particular, many processes and materials for heat-sensitive recording have long been known. For example, examples of heat-sensitive recording materials comprising electron-donating dye precursors and electron-accepting compounds are disclosed in JP-B-43-4160, and JP-B-45-14039. Examples of heat-sensitive recording materials comprising diazo compounds are disclosed in JP-A-59-190886, and JP-A-63-98485. Examples of heat-sensitive recording materials comprising a chelating compound formed of ferric stearate and gallic acid are disclosed in U.S. Pat . No. 2,663,654. In recent years, these heat-sensitive recording systems have been applied in a variety of fields such as the facsimile, printer and label fields and have been in growing demand.

As the demand for such heat-sensitive recording systems has grown, recording materials have been desired which can provide heat-sensitive recording at a higher rate and provide a sufficient density at a low energy. In recent years, since heat-sensitive papers have been used to form high picture quality images equivalent to that of silver salt photographs, a high picture quality heat-sensitive paper has been desired which can provide an improved dot reproducibility with respect to a printing head.

One approach for providing an improved heat-sensitive recording material there has been proposed in JP-A-63-116890, in which an interlayer comprising as main components a pigment and a binder is provided interposed between a heat-sensitive recording layer and a support so that the smoothness of the heat-sensitive recording material is improved to enable typing at a lower energy. Despite its contribution to some improved sensitivity, this material leaves much to be desired. This material cannot provide a sufficient desired sensitivity. This material cannot exhibit a sufficient running property. Thus, this material is not practical.

SUMMARY OF THE INVENTION

It is therefore an object of the present invention to provide a heat-sensitive recording material which can provide a high printing density at a low energy and exhibit no attachment of tailings from the head, excellent running property and excellent dot reproducibility.

The above and other objects of the present invention will become more apparent from the following detailed description and examples.

These objects of the present invention are accomplished with a heat-sensitive recording material comprising a support having provided thereon a heat-sensitive recording layer, wherein (a) a microporous layer comprising at least one of a synthetic resin and a cellulose compound or (b) a layer comprising porous grains comprising secondary particles bound to the surface of primary particle as core is provided between the heat-sensitive recording layer and the support of the recording material.

DETAILED DESCRIPTION OF THE INVENTION

Interlayer (a) of the present invention will be further described hereafter.

As the interlayer (a) of the present invention, any microporous material comprising as a main component a synthetic resin and/or a cellulose compound may be used to accomplish the objects of the present invention. The preparation of such an interlayer can be accomplished by casting a solution of a synthetic resin and/or a cellulose compound in a thin film on a support, and then removing or exchanging the solvent under proper conditions. The film thickness of the microporous interlayer (a) is preferably from 1 to 100 μm, and more preferably 5 to 50 μm. The pore diameter of the microporous interlayer (a) is preferably from 0.05 to 1,000 μm, and more preferably 0.1 to 200 μm.

The pore density of the microporous interlayer (a) of this invention is preferably 0.3 to 0.95, more preferably 0.6 to 0.9. The "pore density (ε)" as used herein can be defined by the following equation:

$$\epsilon = 1 - \rho_t/\rho_t$$

wherein $\rho_p$ is a bulk density of the material (support) and $\rho_t$ is a vacuum density of solid substance (true density).

As the support on which the solution of a synthetic resin and/or cellulose compound is cast there may be used any commonly used material such as paper or synthetic resin film for use in the field of ordinary heat-sensitive recording material. Specific examples of such a material are disclosed in JP-A-61-2971760, JP-A-62-41082, JP-A-62-51478, JP-A-62-53879, and JP-A-62-73991, the contents of which are hereby incorporated by reference. (The present specification refers to numerous documents throughout, and the contents of each of these documents are hereby incorporated by reference).

Such a microporous film has long been known. The details of such a microporous film are described in R. Kesting, *Synthetic Polymer Membranes,* McGraw-Hill, 1971.

As specific film forming materials which can be used in such a microporous layer there have been known materials comprising as a main component a cellulose ester as described in U.S. Pat. Nos. 1,421,341, 3,133,132, and 2,944,017, and JP-B-43-15698, JP-B-45-33313, JP-B-48- 39586, and JP-B-48-40050, a material comprising as a main component an aliphatic polyamide as described in U.S. Pat. Nos. 2,783,894, 3,408,315, 4,340,479, 4,340,480, and 4,450,126, West German Patent No. DE 3,138,525, and JP-A-58-37842, a material comprising as a main component a polyfluorocarbon as described in U.S. Pat. Nos. 4,196,070, and 4,340,482, and JP-A-55-99934, and JP-A-58-91732, a material comprising as a main component a polysulfone as described in JP-A-56-154051, JP-A-56-86941, and JP-A-5612640, a material comprising as a main component polypropylenes as described in West German Patent Application No. (OLS) 3,003,400, a material comprising as a main component a nylon as described in JP-B-49-8707, and a material comprising as a main component a polyvinylidene chloride or a polyvinyl alcohol. Any of the above materials can be used to obtain the effects of the present invention. In particular, a material comprising a cellulose acetate compound as a main component may be preferably used in the present invention.

Interlayer (b) of the present invention will be further described hereafter.

As the porous grains to be incorporated in interlayer (b), there may be used grains comprising secondary particles smaller than core bound to the surface of spherical primary particle as core. The preparation of such porous grains can be normally accomplished by an emulsion polymerization process, a mechanochemical process (which comprises the steps of mixing larger sized grains with smaller sized grains by using a vibration mill or a grinder, etc., and then binding the smaller sized grains to the surface of the larger sized grains), or the like. In particular, porous grains comprising a styrene-acrylic high molecular weight compound as a main component may be preferably used to accomplish the objects of the present invention.

The outer diameter of the porous grains is preferably in the range of 0.1 to 10 μm, particularly 0.5 to 2 μm. The oil absorption of the present porous grains is preferably in the range of 60 g/100 ml or more, particularly 85 g /100 ml or more as determined by the linseed process (according to JIS K-5101).

The porous grains are coated on the support together with a binder. The coat thus obtained is used as an interlayer. As a suitable binder there may be used any commonly used binder material such as water-soluble high molecular weight compounds (e.g., polyvinyl alcohol (PVA), styrene-maleic anhydride copolymer, starch, cellulose compound), and latex (e.g., styrene-butadiene rubber latex). The amount of the binder which can be used is from 3 to 500 wt %, preferably 5 to 50 wt % as calculated in terms of solids content, based on the weight of the porous grains. Furthermore, the porous grains and binder may be used in combination with pigments or additives as described later. The coated amount of the interlayer (b) is from 0.5 to 50 $g/m_2$, preferably 3 to 10 $g/m_2$ as calculated in terms of dried solids content.

The film thickness of the interlayer (b) is preferably from 0.1 to 50 μm, and more preferably 2 to 10 μm.

As the support which can be used, there can be used any support material, such as paper or a synthetic resin film, which is ordinarily used in a heat-sensitive recording material. Specific examples of such support materials are described in JP-A-61-2971760, JP-A-62-53879, and JP-A-62-73991.

As the heat-sensitive recording layer to be coated on the interlayer, there can be used any material which responds sensitively to heat to form visible images. As such a material there is commonly used a material which undergoes a color forming reaction between an electron-donating dye precursor (color former) and an electron-accepting compound (color developer) as disclosed in JP-B-43-4160, JP-B-45-14039, JP-B-60-23922, JP-A-51-179836, JP-A-60-123556, JP-A-60-123557, and JP-A-63-95977, a material comprising a diazo compound as disclosed in JP-A-59-190886, JP-A-60-6493, JP-A-6l-279593, and JP-A-63-89378, or a material comprising a chelate compound, such as the chelate compound formed of ferric stearate and gallic acid as disclosed in U.S. Pat. No. 2,663,654.

Examples of an electron-donating dye precursor which may be used in the color forming reaction with an electron-accepting compound include a triphenylmethanephthalide compound, diphenylmethane compound, triphenylmethane compound, fluoran compound, triarylmethane compound, indolyphthalide compound, leucoauramine compound, xanthene compound, phenothiazine compound, and spiropyran compound.

As an electron-accepting compound there may be preferably used a phenol compound, a phenol resin, acid clay or a salicylic acid compound or a polyvalent metal salt thereof. Specific examples of such compounds are described in U.S. Reissued Pat. No. 23,024, U.S. Pat . No. 3,624,107, and JP-A-55-227253, and JP-A-63-95977.

Specific examples of a triarylmethane compound include 3,3-bis(p-dimethylaminophenyl)-6-dimethylaminophthalide, 3,3-bis(p-dimethylaminophenyl)phthalide, 3-(p-dimethylaminophenyl)-3-(1,3-dimethylindol-3-yl)phthalide, and 3-(p-dimethylaminophenyl)-3-(2-methylindol-3-yl)phthalide.

Specific examples of a diphenylmethane compound include 4,4'-bis-dimethylaminobenzhydrinbenzylether, N-halophenyl-leucoauramine, and N-2,4,5-trichlorophenyl leucoauramine.

Specific examples of a xanthene compound include rhodamine-B-anilinolactam, rhodamine-(p-nitrino)lactam, 2-(dibenzylamino)fluoran, 2-anilino-3-methyl-6-diethylaminofluoran, 2-anilino-3-methyl-6-dibutylaminofluoran, 2-anilino-3-methyl-6-N-ethyl-N-isoamylaminofluoran, 2-anilino-3-methyl-6-N-methyl-N-cyclohexylaminofluoran, 2-anilino-3-chloro-6-diethylaminofluoran, 2-anilino-3-methyl-6-N-ethyl-N-isobutylaminofluoran, 2-anilino-6-dibutylaminofluoran, 2-anilino-3-methyl-6-N-methyl-N-tetrahydrofurfurylaminofluoran, 2-anilino-3-methyl-6-piperidinoaminofluoran, 2-(o-chloroanilino)-6-diethylaminofluoran, and 2-(3,4-dichloroanilino)-6-diethylaminofluoran.

Specific examples of a thiazine compound include benzoylleucomethylene blue, and p-nitrobenzyl-leucomethylene blue.

Specific examples of a spiro compound include 3-methyl-spiro-dinaphtopyran, 3-ethyl-spiro-dinaphthopyran, 3,3'-dichloro-spiro-dinaphthopyran, 3-benzylspirodinaphthopyran, 3-methyl-naphtho-(3-methoxybenzo)spiropyran, and 3-propyl-spiro-dibenzopyran.

The color farmers are preferably used in an amount of 0.2 to 2 $g/m^2$, more preferably 0.3 to 1 $g/m^2$.

As a suitable color developer which can be used in the practice of the present invention, there may be preferably used a phenolic compound or a salicylic acid compound or a polyvalent metal salt thereof.

Specific examples of a phenolic compound which can be used include 2,2'-bis(4-hydroxyphenyl)propane, 4-t-butylphenol, 4-phenylphenol, 4-hydroxydiphenoxide, 1,1'-bis(3-chloro-4-hydroxyphenol)cyclohexane, 1,1'-bis(4-hydroxyphenyl)cyclohexane, 1,1'-bis(3-chloro-4-hydroxyphenyl)-2-ethylbutane, 4,4'-sec-isooctylidenediphenol, 4,4'-sec-butylidenediphenol, 4-tert-octylphenol, 4-p-methylphenylphenol, 4,4'-methylcyclohexylidenephenol, 4,4'-isopentylidenephenol, and benzyl p-hydroxybenzoate.

Specific examples of salicyclic acid compounds include 4-pentadecylsalicylic acid, 3,5-di(α-methylbenzyl)salicylic acid, 3,5-di(tert-octyl)salicylic acid, 5-octadecylsalicylic acid, 5-α-(p-α-methylbenzylphenyl-)ethylsalicylic acid, 3-α-methylbenzyl5-tert-octylsalicylic acid, 5-tetradecylsalicylic acid, 4-hexyloxysalicylic acid, 4-cyclohexyloxysalicylic acid, 4-decyloxysalicylic acid, 4-dodecyloxysalicylic acid, 4-pentadecyloxysalicylic acid, 4-octadecyloxysalicylic acid, and salts thereof with zinc, aluminum, calcium, copper, and lead.

The color developers may be preferably used in an amount of 50 to 800 wt %, particularly 100 to 500 % by weight based on the weight amount of color former. If the color developer is used in an amount of less than 50 % by weight, it doesn't sufficiently form colors. On the other hand, if the color developer is used in an amount of more than 800 % by weight, it cannot be expected to provide further effects.

In order to improve its heat response, the present heat-sensitive recording material of the present invention may contain a heat-fusible material in the heat-sensitive recording material. Examples of suitable heat-fusible materials include benzyl p-benzyloxybenzoate, β-naphtyl benzylether, amide stearate, stearylurea, p-benzylbiphenyl, di(2-methylphenoxy)ethane, di(2-methoxyphenoxy)ethane, β-naphthol-(p-methylbenzyl)ether, α-naphthylbenzylether, 1,4-butanediol-p-methylphenylether, 1,4-butanediol-p-isopropylphenyl ether, 1,4-butanediol-p-tert-octylphenylether, 1-phenoxy-2-(4-ethylphenoxy)ethane, 1-phenoxy-2-(4-chlorophenoxy)ethane, 1,4-butanediolphenylether, and diethyleneglycol-bis(4-methoxyphenyl)ether. These heat-fusible materials may be used, singly or in an admixture. In order to obtain a sufficient heat response, such a heat-fusible material may be preferably used in an amount of 10 to 300 % by weight, more preferably 20 to 200 % by weight, based on the amount of color developer.

As a suitable diazo compound which can be incorporated in the heat-sensitive recording material comprising a diazo compound, there may be used a diazonium salt represented by the general formula $ArN_2^+X^-$(in which Ar represents a substituted or unsubstituted aromatic ring, $N_2^+$ represents a diazonium group, and $X^-$ represents an acid anion). Such a diazonium salt can be selected from the compounds described in JP-A-59-190866, JP-A-60-6493 and JP-A-61-27953.

The coupler which can be used in the color formation reaction with a diazonium salt is a compound which undergoes coupling with a diazo compound (diazonium salt) to form a dye. As such a compound there may be employed the commonly used anilide 2-hydroxy-3-naphthoate or the like. Specific examples of such a compound are described in JP-A-59-190886. In this case, the recording layer in the heat-sensitive recording material preferably may optionally comprise a suitable basic material in order to render the system basic so that the coupling reaction is accelerated. Specific examples of such a basic material include guanidines such as triphenyl guanidine. Further specific examples of such a basic material are disclosed in JP-A-59-190886, and JP-A-6-27953. The amount of the coupling component which can be used is preferably from 0.1 to 30 parts by weight based on 1 part by weight of diazo compound. The amount of the basic material to be used is preferably from 0.1 to 30 parts by weight based on 1 part by weight of diazo compound. The coated amount of the diazo compound is preferably from 0.05 to 5.0 g/m$^2$.

The heat-sensitive recording material containing a diazo compound may contain as a sensitizer or improving heat color developability a hydroxylated compound, a carbamic ester compound, aromatic alkoxy compound or an organic sulfonamide compound. Specific examples of such a sensitizer are disclosed in JP-A-62-77981. The amount of such a sensitizer which can be used is from 0.01 to 10 parts by weight, preferably 0.1 to 5 parts by weight based on 1 part by weight of coupling component. The amount of such a sensitizer can be properly adjusted depending on the desired color density.

At least one of these diazo compounds, couplers and optionally basic materials may be preferably used as core material for a microcapsule to aid the preservability of the recorded images or the preservability of unused heat-sensitive recording material. Specific examples of such a microcapsule are described in U.S. Pat. Nos. 3,726,804, and 3,796,669, and JP-A-59-190886, and JP-A-63-89378. The other components which are not contained in the core material are incorporated in the heat-sensitive layer outside the microcapsules.

If a diazo compound is used as a color former, the diazo compound in the thermal printed area may be decomposed by irradiation with light to be light-fixed. In order to improve the fastness of printed images thus light-fixed and inhibit discoloration of non-printed portions which are subject to coloring, the heat-sensitive recording material may preferably contain a hindered phenol compound and/or derivative thereof, optionally in combination with other discoloration inhibitors.

The heat-sensitive recording material comprising a chelate compound may comprise as a metal salt for formation of a chelate compound a salt of stearic acid, behenic acid, pelargonic acid or caproic acid with zinc, lead, tin, iron, nickel, cobalt, copper or silver and as a reagent which reacts with such a metal salt tannin, gallic acid, hexamethylenetetramine, pyrogallol, hydroquinone, spiroindanthiosulfate, phenetidine chloride or dioxamide. The details of such compounds are described in Shashin Kogyo (extra issue), Vol. 222, p. 58 (published by Shashin Kogyo Shuppansha on Aug. 15, 1970).

In the present invention, the dispersion of color former, color developer or heat-fusible material can be effected in a water-soluble binder. As such a binder there may be preferably used any suitable compound which can be dissolved in water of 25° C. in an amount of 5 % by weight or more. Specific examples of such a compound include a polyvinyl alcohol (e.g., modified polyvinyl alcohol such as carboxy-modified, itaconic acid-modified, maleic acid-modified and silica-modified polyvinyl alcohol), methyl cellulose, carboxymethyl cellulose, starch (including modified starch), gelatin, gum arabic, casein, hydrolyzate of styrene-maleic anhydride copolymer, polyacrylamide, and saponification products of vinyl acetate-polyacrylic acid copolymer. These binders may be used not only for the dispersion but also for the improvement of coating film strength. For the latter purpose, latex binders made of synthetic high molecular weight compounds such as styrene-butadiene copolymer, vinyl acetate copolymer, acrylonitrile-butadiene copolymer, methyl acrylate-butadiene copolymer or polyvinylidene chloride can be used in combination with the above described binders. A suitable binder crosslinking agent can be optionally used depending on the type of the binder to be used.

The heat-sensitive recording layer of the present invention may further optionally comprise a pigment, metallic soap, wax, surface active agent, antistatic agent, ultraviolet absorber, antioxidant, water holding agent, defoaming agent, electrically conducting agent, fluorescent dye, coloring dye or the like.

Examples of a pigment which can be used include calcium carbonate, barium sulfate, lithopone, agalmatolite, kaolin, silica or amorphous silica.

Examples of a metallic soap which can be used include a metallic salt of a higher aliphatic acid such as zinc stearate, calcium stearate, and aluminum stearate.

Examples of a wax which can be used include paraffin wax, microcrystalline wax, carnauba wax, methylol stearoylamide, polyethylene wax, polystyrene wax or aliphatic acid amide wax. These waxes may be used singly or in admixture.

In order to inhibit fading in the printed image portions and improve the fastness of formed images, the heat-sensitive recording layer may preferably contain a suitable fading inhibitor. Examples of a fading inhibitor which can be effectively used include a phenol compound, particularly a hindered phenol compound. Specific examples of such a fading inhibitor include 1,1,3-tris(2-methyl-4-hydroxy-tert-butylphenyl)butane, 1,1,3-tris( 2-ethyl-4-hydroxy-5-tert-butylphenyl)butane, 1,1,3-tris(3,5-di-tert-butyl-4-hydroxyphenyl)butane, 1,1,3-tris(2-methyl-4-hydroxy-5-tert-butylphenyl)propane, 2,2'-methylenebis(6-tert-butyl-4-methylphenol), 2,2'-methylene-bis(6-tert-butyl-4-ethylphenol), 4,4'-butylidene-bis(6-tert-butyl-3-methylphenol), and 4,4'-thio-bis(3-methyl-6-tertbutylphenol). The amount of such a phenolic compound to be used is preferably from 1 to 200 % by weight, particularly 5 to 50 % by weight based on the amount of electron-accepting compound.

The heat-sensitive recording layer coating solution is coated on the support on which the interlayer has been coated in such an amount that the coated amount of the color former reaches 0.2 to 2.0 g/m$^2$.

The surface of the support on which the interlayer has been coated may be preferably subjected to corona discharge, glow discharge, irradiation with ultraviolet rays, acid etching with a chromium nitrate solution or flame treatment with gas flame before the heat-sensitive recording layer coating solution is coated thereon in order to improve its wetting or adhesion to the heat-sensitive recording layer. In order to improve the lubricity of the surface of the heat-sensitive recording material, an interlayer other than the above-described interlayers of the present invention, comprising as main component a pigment or binder may be provided interposed between the surface of the interlayer of the present invention and the heat-sensitive recording layer.

The heat-sensitive recording material thus prepared is then dried and calendered before use.

A protective layer may be optionally provided on the heat-sensitive recording layer. As such a protective layer there may be used any compound known as being useful as a protective layer for heat-sensitive recording material.

The support of the heat-sensitive recording material may be provided with a back coat layer on the side opposite to the heat-sensitive recording layer. As such a back coat layer there may be used any compound known as being useful as a back coat layer for heat-sensitive recording material.

The present invention will be further described in the following examples, but the present invention should not be construed as being limited thereto. All parts and percentages herein are based on weight unless otherwise indicated.

EXAMPLE 1

An interlayer coating solution having the belowmentioned composition was prepared. The coating solution thus prepared was then coated onto a fine paper by means of a coating bar in a dried weight of 7 g/m$^2$. The coat was then dried at a temperature of 50° C. for 1 minute. The surface of the coat was treated through a calender to obtain a support provided with the present interlayer.

| Interlayer coating solution | |
|---|---|
| 44 wt % Dispersion of finely divided binding porous material (Mitsui Toatsu Chemicals, Inc.'s XMRP-110: styrene-acrylic copolymer) | 100 parts |
| Styrene-butadiene rubber emulsion (Sumitomo Nogatac's SN-307) | 10 parts |
| Water | 40 parts |

20 g of 2-anilino-3-methyl-6-N-ethyl-N-isoamylaminofluoran was subjected to dispersion with 100 g of a 5 wt % aqueous solution of polyvinyl alcohol (Kuraray Co., Ltd.'s PVA-105) in a ball mill over a whole day and night so that the average particle diameter of the dispersion reached 1.5 μm or less to prepare a first dispersion. A second dispersion containing 20 g of benzyl para-hydroxybenzoate and a third dispersion containing 20 g of β-naphthyl-benzylether were prepared in an identical manner so that the average particle diameters of each dispersion was 1.5 μm or less. Thus, three dispersions of these materials were obtained. 80 g of calcium carbonate was then subjected to dispersion with 160 g of a 0.5 % solution of sodium hexamethaphosphate in a homogenizer to obtain a pigment dispersion.

These four dispersions were then mixed in the following composition to obtain a heat-sensitive recording layer coating solution.

| Composition of heat-sensitive recording layer coating solution | |
|---|---|
| Dispersion of 2-anilino-3-methyl-6-N-ethyl-N-isoamylaminofluoran | 5 parts |
| Dispersion of 2,2'-bis(4-hydroxyphenyl)propane | 10 parts |
| Dispersion of β-naphthyl-benzylether | 5 parts |
| 33 wt % Dispersion of calcium carbonate parts | 22 parts |
| 20 wt % Dispersion of zinc stearate | 3 parts |

The heat-sensitive recording layer coating solution thus prepared was then coated on the support on which the interlayer had been coated by means of a coating bar in a dried amount of 5 g/m$^2$. The coat was then dried at a temperature of 50° C. for 1 minute to obtain a heat-sensitive recording paper.

EXAMPLE 2

3.45 parts of the belowmentioned diazo compound and 18 parts of a 3:1 addition product of xylilenediisocyanate and trimethylolpropane were dissolved in a mixture of 24 parts of tricresyl phosphate and 5 parts of ethyl acetate. The solution thus obtained was then mixed with 64 parts of a 8 wt % aqueous solution of polyvinyl alcohol. The mixture was then subjected to emulsion dispersion at a temperature of 20° C. to obtain an emulsion of grains having an average particle diameter of 2.5 μm. 100 parts of water was then added to the emulsion thus obtained. The mixture was then heated to a temperature of 60° C. with stirring. After two hours, a solution of capsules comprising the diazo compound as core material was obtained.

Diazo compound

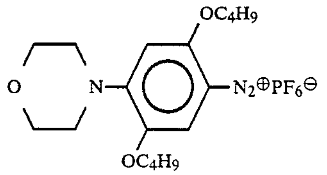

10 parts of anilide 2-hydroxy-3-naphthoate, 10 parts of triphenyl guanidine and 20 parts of hydroquinone monobenzylether were added to 200 parts of 5 wt % polyvinyl alcohol. The mixture was then subjected to dispersion in a ball mill for 24 hours to obtain a dispersion of grains of coupling component, triphenyl guanidine and hydroquinone monobenzylether having an average particle diameter of 2 μm.

A coating solution was then prepared having the following composition:

| Coating solution | |
|---|---|
| Capsule solution as described above | 50 parts |
| Dispersion of coupling component, etc. as described above | 50 parts |
| 40 wt % Dispersion of calcium carbonate | 5 parts |
| 10 wt % Polyvinyl alcohol (Kuraray Co., Ltd.'s PVA-117) | 50 parts |
| 20 wt % Dispersion of zinc stearate | 3 parts |

The coating solution thus prepared was then coated on the support as prepared in Example 1 by means of a coating bar in a dried amount of 10 g/m². The coat was then dried at a temperature of 50° C. for 1 minute to obtain a heat-sensitive recording paper.

EXAMPLE 3

A coating solution having the belowmentioned composition was coated as a protective layer on the heat-sensitive recording layer of the heat-sensitive recording material as prepared in Example 1 in a dried amount of 3 g/m². The coat was then dried at a temperature of 50° C. for 1 minute.

| | |
|---|---|
| 10 wt % Silica-modified PVA (Kuraray Co., Ltd.'s R-2105) | 70 parts |
| 30 wt % Colloidal silica (Nissan Chemical Industries, Ltd.'s Snowtex 30) | 10 parts |
| 20 wt % Dispersion of zinc stearate | 3 parts |
| 30 wt % Dispersion of kaolin | 20 parts |
| Water | 30 parts |

COMPARATIVE EXAMPLE 1

A heat-sensitive recording paper was prepared in the same manner as in Example 1, except that the heat-sensitive recording layer coating solution was coated on the woodfree paper on which the interlayer had not been

COMPARATIVE EXAMPLE 2

A heat-sensitive recording paper was prepared in the same manner as in Example 1, except that the interlayer coating solution coated on the support was replaced by a coating solution having the following composition:

| Coating solution | |
|---|---|
| 30 wt % Dispersion of calcium carbonate | 120 parts |
| 48 wt % Styrene-butadiene rubber emulsion (Sumitomo K.K.'s SN-307) | 10 parts |
| Water | 20 parts |

The heat-sensitive recording paper specimens thus prepared were then subjected to surface treatment through a calender. Pulses were printed on these heat-sensitive recording papers with widths of 0.8, 1.0 and 1.2 at a head voltage of 24 V and a pulse cycle of 10 ms in a heat-sensitive printing tester provided with a Kyocera thermal head KLT-216-8MPD1. These specimens were then measured for printing density by means of a Macbeth reflection densitometer RD-918. Furthermore, these specimens were observed for the degree of attachment of tailings from the thermal head in the printing machine.

The results are shown in Table 1.

TABLE 1

| Example No. | Color density Typing pulse width (ms) 0.80 | 1.00 | 1.20 | Tailings from thermal head |
|---|---|---|---|---|
| Example 1 | 0.88 | 1.26 | 1.34 | Excellent |
| Example 2 | 0.80 | 1.10 | 1.25 | Excellent |
| Example 3 | 0.82 | 1.22 | 1.32 | Excellent |
| Comparative example 1 | 0.76 | 1.12 | 1.20 | Fair |
| Comparative example 2 | 0.84 | 1.24 | 1.33 | Poor |

Table 1 shows that the heat-sensitive recording paper according to the present invention exhibits an excellent color density even at a low energy and no attachment of tailings from the printing head. Thus, the present heat sensitive recording paper proves to be extremely fair.

EXAMPLE 4

A uniformly mixed solution having the belowmentioned composition (1) was prepared. The solution thus prepared was then cast on a woodfree paper by means of a doctor blade. The coat was then dried at room temperature for 2 hours and at a temperature of 80° C. for 30 minuets to form a microporous interlayer having a film thickness of about 20 μm.

| Composition (1) | |
|---|---|
| Cellulose acetate (acetylation degree: 5.50) | 6 parts |
| Glycerin | 1 part |
| Methylene chloride | 54 parts |
| Methanol | 35 parts |
| Water | 5 parts |

As in Example 1, 20 g of 2-anilino-3-methyl-6-N-ethyl-N-isoamylaminofluoran, 20 g of benzyl parahydroxybenzoate and 20 g of β-naphthyl-benzylether were each subjected to dispersion with 100 g of a 5 wt % aqueous solution of polyvinyl alcohol (Kuraray Co., Ltd.'s PVA 105) in a ball mill over a whole day and night so that the average particle diameter of each dispersion reached 1.5 μm or less. Thus, three dispersion of these materials were obtained. 80 g of calcium carbonate was subjected to dispersion with 160 g of a 0.5 wt % sodium hexamethaphosphate to obtain a pigment dispersion.

These four dispersions were then mixed in the belowmentioned composition to obtain a heat-sensitive recording layer coating solution.

The heat-sensitive recording layer coating solution thus prepared was then coated on the porous interlayer coated on the woodfree paper by means of a coating bar in a dried amount of 5 $g/m^2$. The coat was then dried at a temperature of 50° C. for 1 minute to obtain a heat-sensitive recording sheet.

| Composition of heat-sensitive recording layer coating solution | |
|---|---|
| Dispersion of 2-anilino-3-methyl-6-N-ethyl-N-isoamylaminofluoran | 5 parts |
| Dispersion of 2,2'-bis(4-hydroxyphenyl)propane | 10 parts |
| Dispersion of β-naphthyl-benzylether | 5 parts |
| Dispersion of calcium carbonate | 22 parts |
| 20% dispersion of zinc stearate | 3 parts |

EXAMPLE 5

A uniformly mixed solution having the belowmentioned composition (2) was prepared. The solution thus prepared was then cast on a woodfree paper. The surface of the coat was then covered for 2 seconds. The coat was then allowed to stand in the air for several seconds. The material was then dipped in a coagulating bath filled with 20° C. water. The solvents were removed from the material. The material was then dried to obtain a microporous interlayer having a film thickness of about 20 μm.

| Composition (2) | |
|---|---|
| Polysulfon (ICI's P-3500) | 15 parts |
| N-methyl-2-pyrrolidone | 70 parts |
| Polyvinyl pyrrolidone | 15 parts |

The heat-sensitive recording layer coating solution as obtained in Example 1 was coated on the porous interlayer coated on the woodfree paper by means of a coating bar in a dried amount of 5 $g/m^2$. The coat was then dried at a temperature of 50° C. for 1 minute to obtain a heat-sensitive recording sheet.

EXAMPLE 6

A coating solution having the belowmentioned composition (3) was further coated on the microporous layer as obtained in Example 4 by means of a coating bar in a dried amount of 5 $g/m^2$. The coat was then dried at a temperature of 50° C. for 1 minute to obtain a second interlayer.

| Composition (3) | |
|---|---|
| 40 wt % Dispersion of calcium carbonate | 30 parts |
| 48 wt % SBR latex (Sumitomo Nogatac K.K.'s SN-307) | 5 parts |
| Water | 20 parts |

The heat-sensitive recording layer coating solution as obtained in Example 1 was coated on the second interlayer thus obtained by means of a coating bar in a dried amount of 5 $g/m^2$. The coat was then dried at a temperature of 50° C. for 1 minute to obtain a heat-sensitive recording sheet.

EXAMPLE 7

A heat-sensitive recording sheet was prepared in the same manner as in Example 4, except that the woodfree paper used as support was replaced by a synthetic paper (Oji Yuka K.K.'s Yupo).

EXAMPLE 8

A heat-sensitive recording sheet was prepared in the same manner as in Example 4, except that the woodfree paper used as support was replaced by a polyester film.

COMPARATIVE EXAMPLE 3

The heat-sensitive recording layer coating solution as obtained in Example 4 was coated on the woodfree paper on which the microporous interlayer had not been coated by means of a coating bar in a dried amount of 5 $g/m^2$. The coat was then dried at a temperature of 50° C. for 1 minute to obtain a heat-sensitive recording sheet.

COMPARATIVE EXAMPLE 4

The coating solution having the composition (3) as obtained in Example 6 was coated on a woodfree paper by means of a coating bar in a dried amount of 5 $g/m^2$. The coat was then dried at a temperature of 50° C. for 1 minute. The heat-sensitive recording layer coating solution as obtained in Example 4 was further coated on the coat by means of a coating bar in a dried amount of 5 $g/m^2$. The material was dried at a temperature of 50° C. for 1 minute to obtain a heat-sensitive recording sheet.

COMPARATIVE EXAMPLE 5

A heat-sensitive recording sheet was prepared in the same manner as in Comparative Example 3, except that the woodfree paper used as support was replaced by a synthetic paper (Oji Yuka K.K.'s Yupo).

The heat-sensitive recording paper specimens thus prepared were then subjected to surface treatment through a calender. Pulses were printed on these heat-sensitive recording papers with widths of 0.8, 1.0 and 1.2 at a head voltage of 24 V and a pulse cycle of 10 ms in a heat-sensitive printing tester provided with a Kyocera thermal head KLT-216-8MPD1. These specimens were then measured for printing density by means of a Macbeth reflection densitometer RD-918.

Furthermore, these specimens were observed for the degree of attachment of tailings from the thermal head in the printing machine (stain on head).

The results are shown in Table 2.

TABLE 2

| | Color density Typing pulse width (ms) | | | Dot | Head |
|---|---|---|---|---|---|
| Specimen No. | 0.80 | 1.00 | 1.20 | reproducibility | stain |
| Example 4 | 0.90 | 1.35 | 1.43 | Good | Good |
| Example 5 | 0.88 | 1.34 | 1.44 | Good | Good |
| Example 6 | 0.89 | 1.35 | 1.45 | Excellent | Good |
| Example 7 | 0.91 | 1.35 | 1.45 | Excellent | Good |
| Example 8 | 0.92 | 1.36 | 1.45 | Good | Excellent |
| Comparative example 3 | 0.55 | 0.90 | 1.25 | Poor | Fair |
| Comparative example | 0.60 | 1.00 | 1.30 | Fair | Good |

TABLE 2-continued

| Specimen No. | Color density Typing pulse width (ms) 0.80 | 1.00 | 1.20 | Dot reproducibility | Head stain |
|---|---|---|---|---|---|
| 4 | | | | | |
| Comparative example 5 | 0.70 | 1.22 | 1.40 | Good | Poor |

Table 2 shows that the heat sensitive recording paper according to the present invention exhibits an excellent color density even at a low energy, excellent dot reproducibility and no attachment of tailings from the head. Thus, the present heat-sensitive paper proves to be extremely good.

While the invention has been described in detail and with reference to specific embodiments thereof, it will be apparent to one skilled in the art that various changes and modifications can be made therein without departing from the spirit and scope thereof.

What is claimed is:

1. A heat-sensitive recording material comprising a support having provided thereon a heat-sensitive recording layer, wherein a layer (b) comprising a binder mixed with porous grains comprising secondary particles bound to the surface of primary particles as a core is provided between said heat-sensitive recording layer and said support of said recording material.

2. The heat-sensitive recording material as in claim 1, wherein said porous grains comprise a styrene-acrylic high molecular weight compound.

3. The heat-sensitive recording material as in claim 1, wherein said porous grains have an outer diameter of 0.1 to 10 μm.

4. The heat-sensitive recording material as in claim 1, wherein said porous grains have an outer diameter of 0.5 to 2 μm.

5. The heat-sensitive recording material as in claim 1, wherein said porous grains have an oil adsorption of at least 60 g/100 ml.

6. The heat-sensitive recording material as in claim 1, wherein said porous grains have an oil adsorption of at least 85 g/100 ml.

7. The heat-sensitive recording material as in claim 1, wherein the binder is present in an amount of 3 to 500 wt %, based on the weight of the porous grains.

8. The heat-sensitive recording material as in claim 1, wherein the binder is present in an amount of 5 to 50 wt %, based on the weight of the porous grains.

9. The heat-sensitive recording material as in claim 1, wherein the film thickness of the layer (b) is from 0.1 to 50 μm.

10. The heat-sensitive recording material as in claim 1, wherein the film thickness of the layer (b) is from 2 to 10 μm.

* * * * *